United States Patent
Yamaguchi et al.

(10) Patent No.: US 8,451,264 B2
(45) Date of Patent: May 28, 2013

(54) METHOD AND SYSTEM OF DISPLAYING AN IMAGE HAVING CODE INFORMATION EMBEDDED

(75) Inventors: Nobuyasu Yamaguchi, Kawasaki (JP); Hirotaka Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 805 days.

(21) Appl. No.: 12/232,094

(22) Filed: Sep. 10, 2008

(65) Prior Publication Data

US 2009/0066689 A1    Mar. 12, 2009

(30) Foreign Application Priority Data

Sep. 12, 2007   (JP) ................. 2007-237273

(51) Int. Cl.
- *G06F 17/00* (2006.01)
- *G09G 5/00* (2006.01)
- *G06K 9/46* (2006.01)
- *G06K 9/36* (2006.01)

(52) U.S. Cl.
USPC ........... 345/418; 345/619; 382/190; 382/239; 382/284

(58) Field of Classification Search
None
See application file for complete search history.

(56) References Cited

U.S. PATENT DOCUMENTS

| | | |
|---|---|---|
| 6,700,989 B1 | 3/2004 | Itoh et al. |
| 7,792,388 B2 * | 9/2010 | Akiyama .................. 382/284 |
| 2001/0044899 A1 | 11/2001 | Levy |
| 2004/0045034 A1 | 3/2004 | Moroo |
| 2004/0234139 A1 * | 11/2004 | Moroo et al. ................ 382/232 |
| 2006/0286489 A1 | 12/2006 | Duffield et al. |
| 2007/0268309 A1 * | 11/2007 | Tanigawa et al. ........... 345/619 |
| 2008/0022218 A1 * | 1/2008 | Cai ............................. 715/769 |
| 2008/0273741 A1 * | 11/2008 | Fujii et al. .................. 382/100 |
| 2008/0309811 A1 * | 12/2008 | Fujinawa et al. ........ 348/333.01 |

FOREIGN PATENT DOCUMENTS

| | | |
|---|---|---|
| EP | 1 775 931 A2 | 4/2007 |
| JP | 11-136618 | 5/1999 |
| JP | 2001-514453 | 9/2001 |
| JP | 2004-096310 | 3/2004 |
| JP | 2004-159309 | 6/2004 |
| JP | 2006-060856 | 3/2006 |
| WO | 99/10837 | 3/1999 |
| WO | 2005/114571 A1 | 12/2005 |

OTHER PUBLICATIONS

Japanese Office Action issued Apr. 19, 2011 in corresponding Japanese Patent Application 2007-237273.
Korean Office Action issued on Dec. 21, 2009 in corresponding Korean Patent Application 10-2008-0089905.
European Search Report dated Dec. 18, 2008 and issued in corresponding European Patent Application 08164206.8.

* cited by examiner

*Primary Examiner* — Tize Ma
(74) *Attorney, Agent, or Firm* — Staas & Halsey LLP (57) ABSTRACT

According to an aspect of an embodiment, a method for displaying an image including a plurality of blocks in which code information can be embedded, includes obtaining a first image including a plurality of blocks, obtaining a second image determined by changing the characteristic value of the selected blocks of the first image so as to associate the value with the code information to be embedded, and displaying the first image data and the second image data, sequentially.

9 Claims, 10 Drawing Sheets

$A < B \rightarrow 0$
$A \geq B \rightarrow 1$

METHOD AND SYSTEM OF DISPLAYING AN IMAGE HAVING CODE INFORMATION EMBEDDED

BACKGROUND OF THE INVENTION

1. Field of the Invention

The invention relates to a technique for displaying images in which code information is embedded.

2. Description of the Related Art

There are techniques for correlating a geometric pattern drawn in an image, for example, a bar code or a two-dimensional bar code, to code information. A bar code or a two-dimensional bar code is a geometric pattern and is visually meaningless to a human.

There is a technique called steganography for embedding code information in image information and extracting the code information by a recipient of the image information. There is one steganography technique in which image information is divided into a plurality of blocks, and code information is embedded using the relationships between the feature values (for example, the average density, the granularity, the chroma, and the barycenter or variance of densities) of the individual blocks. A technique related to the above techniques is disclosed in Japanese Laid-open Patent Publication No. 2006-60856 and Japanese Laid-open Patent Publication No. 2004-96310.

When code information is embedded in image information, for example, the color information of the image information is changed. When the image is printed, the size of the printed image is fixed, and thus the image quality can be adjusted in advance. However, the image may be displayed on a display. In this case, when the image, which is enlarged because the display is large, is displayed, a part of the image where the code information is embedded may be noticeable.

SUMMARY

According to an aspect of an embodiment, a method for displaying an image including a plurality of blocks in which code information can be embedded, includes obtaining a first image including a plurality of blocks, obtaining a second image determined by changing the characteristic value of the selected blocks of the first image so as to associate the value with the code information to be embedded, and displaying the first image data and the second image data, sequentially.

DESCRIPTION OF THE PREFERRED EMBODIMENTS

Terms used in an embodiment will first be defined. In the following description, an original image (first image) is an image to be displayed. In the present embodiment, an original image is an object to be visually recognized by a human. Code information is an object that a decoder reads from image information. An embedded image (second image) includes, for example, image information obtained by adding code information to an original image using bar code information, two-dimensional bar code information, and a steganography technique.

It is an object of the present embodiment to provide a display method in which, even when an image is displayed in a large size on a screen, code information embedded in the image is illegible.

In the present embodiment, a case where a steganography technique is applied will be described. An original image is an image in which code information is to be embedded. An embedded image is an image obtained by adding code information to an original image by steganography.

The outline of the operation in the present embodiment will first be described, and subsequently, the present embodiment will be described in detail.

Before the present embodiment is applied, when displaying embedded images on a screen, a controller successively displays embedded images in all frames. In the embedded images, codes are embedded with an embedding strength that is specified in advance. When the embedded images are displayed, the embedded images being enlarged so that the size of the enlarged embedded images is larger than an original predetermined size because the size of the screen of a display unit is large, noticeable changes occur in a block of each of the embedded images.

Figure 1:
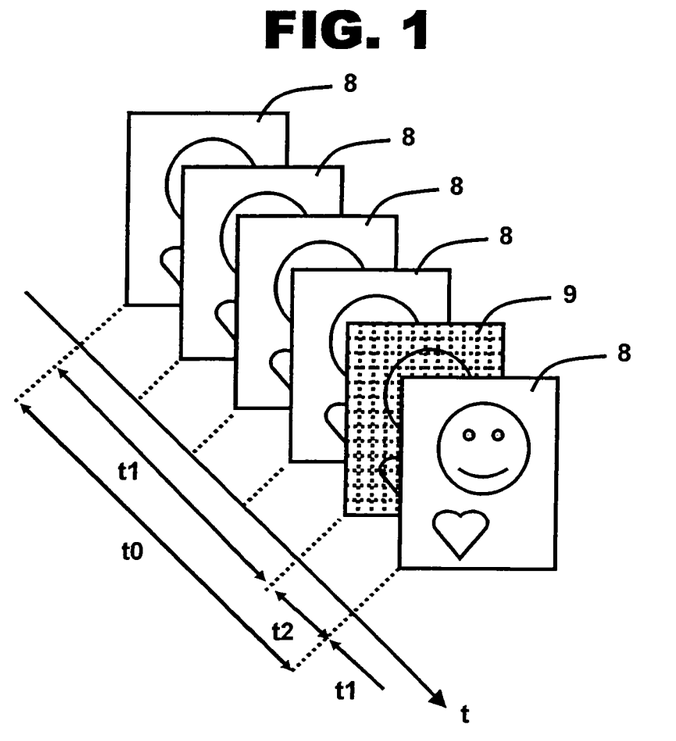
FIG. 1 shows the principle of an embodiment of the invention.

FIG. 1 shows the principle of the present embodiment. Reference letter t0 denotes the unit time. Reference letter t1 denotes a time period during which an original image 8 is displayed. Reference letter t2 denotes a time period during which an embedded image 9 is displayed.

When displaying the embedded image 9 on the screen of a display unit, a controller according to the present embodiment displays the embedded image 9 in one of a plurality of frames that appear in the unit time t0 and displays the original image 8 in the other frames. In the time unit t0, the time period t2 is shorter than the time period t1. As a result, it is hard for a human to visually recognize the embedded image 9. Even when the embedded image 9, which is enlarged, is displayed, changes in a block of the embedded image 9 are invisible. On the other hand, since the embedded image 9 is displayed during the time period t2, a decoder can obtain code information from the embedded image 9.

The embodiment of the invention will now be described.

The configuration of an image processing apparatus 1 according to the present embodiment will now be described.

Figure 2:
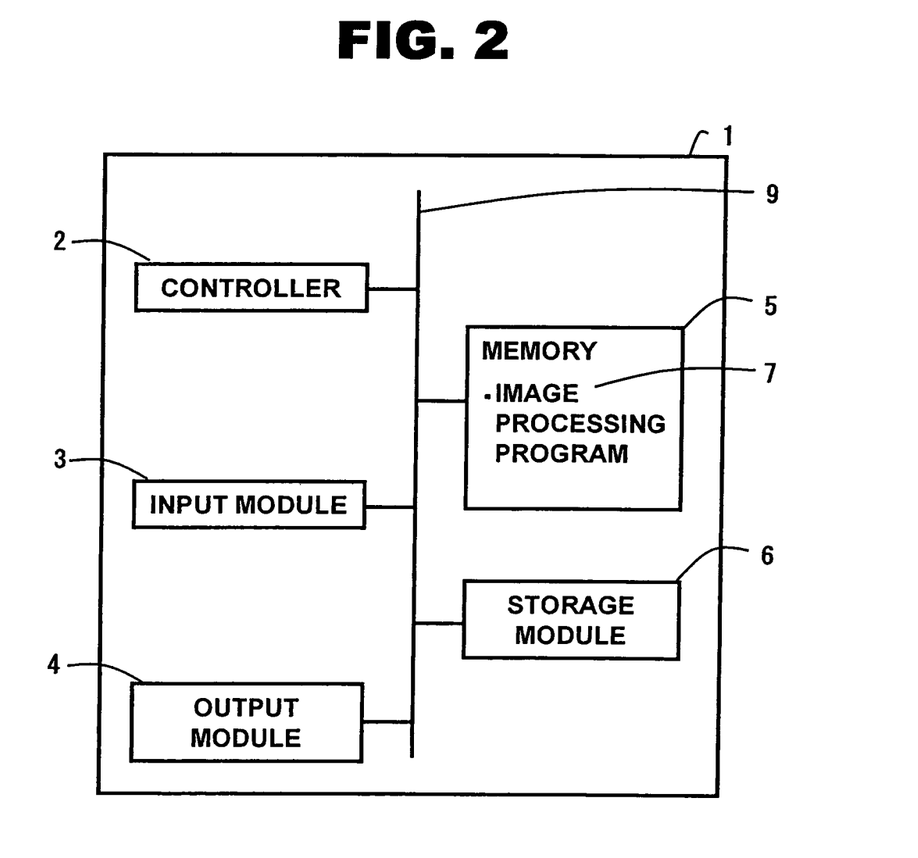
FIG. 2 is a block diagram of an image processing module.

FIG. 2 is a block diagram of the image processing apparatus 1. The image processing apparatus 1 includes a controller 2, an input module 3, an output module 4, a memory 5, and a storage module 6. These components are connected to each other via a bus 9.

Figure 3:
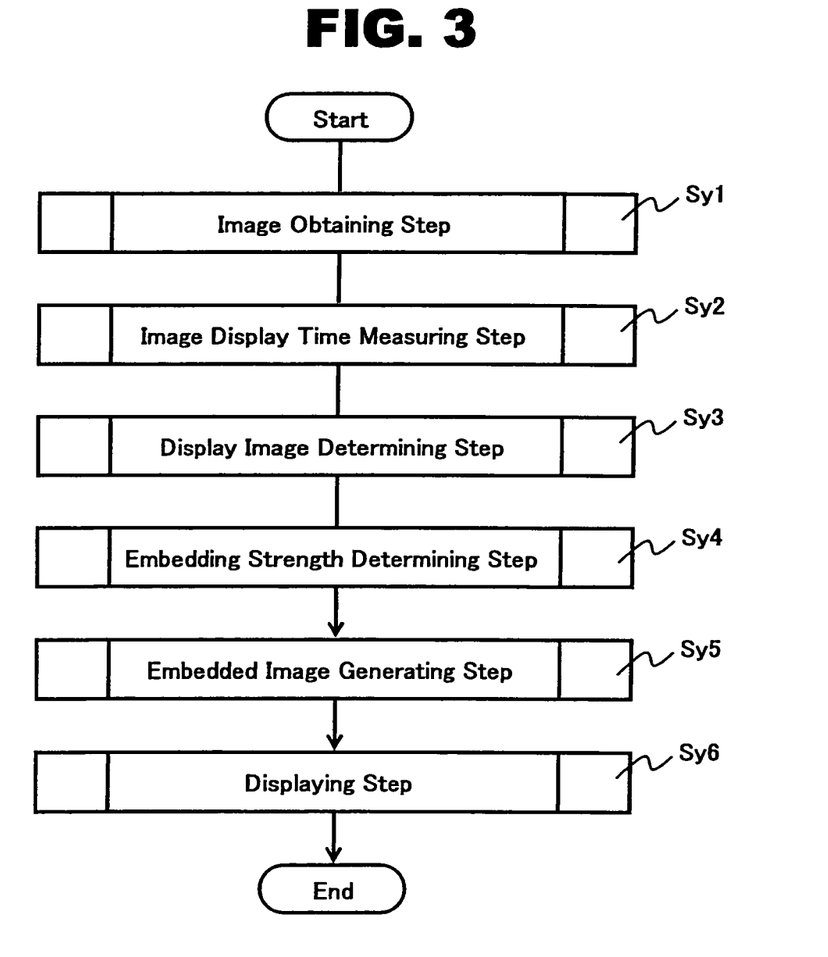
FIG. 3 shows the structure of the basic process in an image processing program executed by a controller.

The controller 2 performs overall control of the image processing apparatus 1. The controller 2 includes, for example, a central processing unit (CPU). The controller 2 executes an image processing program 7 loaded into the memory 5. The image processing apparatus 1 implements image processing functions by executing the image processing program 7 by the controller 2. FIG. 3 shows the structure of the basic process in the image processing program 7 executed by the controller 2. The controller 2 according to the present embodiment performs an image obtaining step (step Sy1) of obtaining an original image and codes as input information, an image display time measuring step (step Sy2) of measuring time during which images are displayed, a display image determining step (step Sy3) of switching between display of an original image and display of an embedded image depending on time, an embedding strength determining step (step Sy4) of determining the embedding strength of codes to be embedded in an original image, an embedded image generating step (step Sy5) of generating an embedded image from an original image and codes depending on the embedding strength, and a displaying step (step Sy6) of displaying information of an original image or information of an embedded image on a display unit depending on time.

The input module 3 receives various instructions or original image information and code information to be supplied to the controller 2. The input module 3 includes, for example, a keyboard, a mouse, a touch panel, and an image scanner. Original image information and code information may be obtained via networks.

The output module 4 displays information on the result of image processing on a screen. The output module 4 is connected to, for example, a television and a display. The output module 4 displays an original image on, for example, a television and a display including the display of a cellular phone.

The memory 5 is a storage area into which the image processing program 7 executed by the controller 2 is loaded. The memory 5 also stores data, such as the result of calculation by the controller 2, the information of the original image 8, code information 81, and the information of the embedded image 9. The memory 5 includes, for example, a random access memory (RAM).

The storage module 6 includes, for example, a hard disk unit. The storage module 6 stores, for example, the image processing program 7, the information of the original image 8, the code information 81, and the information of the embedded image 9.

Figure 4:
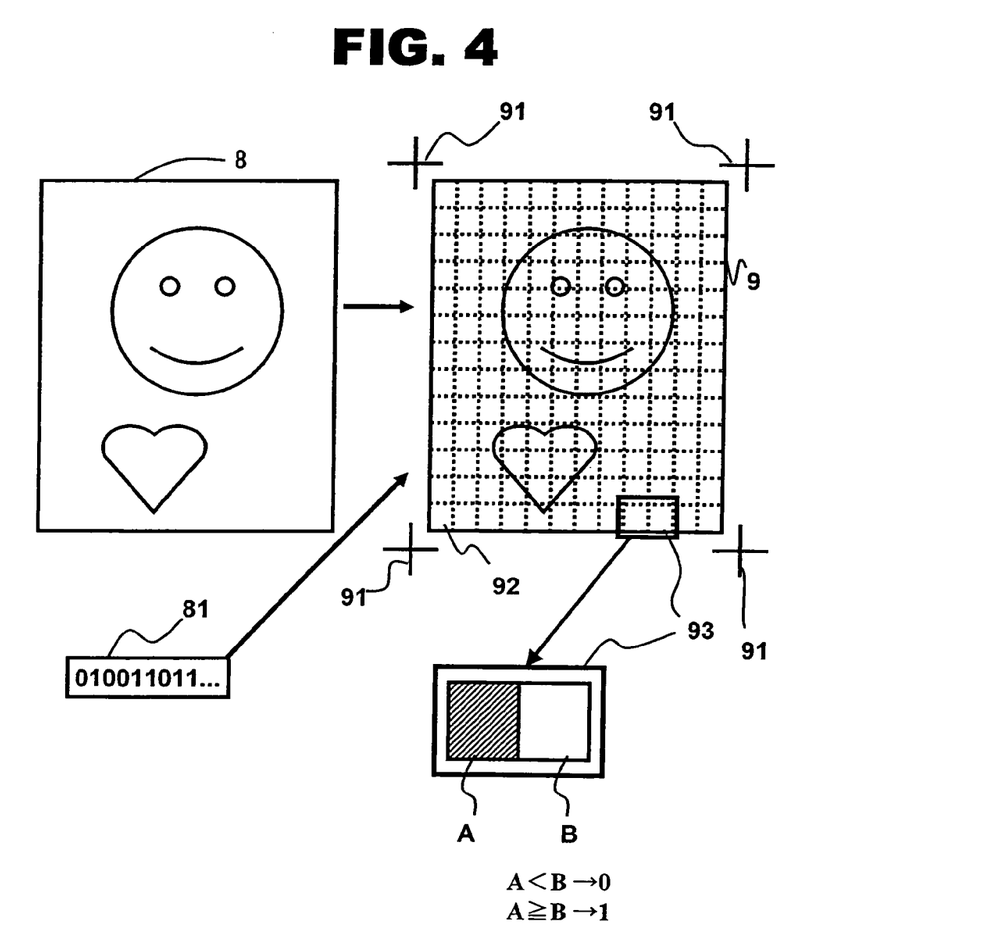
FIG. 4 shows an embedded image.

A steganography technique according to the present embodiment will now be described. FIG. 4 shows an embedded image.

The embedded image 9 is generated by embedding the code information 81 in the original image 8. The original image 8 is image data generated in predetermined format, for example, Joint Photographic Experts Group (JPEG) format or Graphics Interchange Format (GIF) format.

Reference numeral 91 denotes corner marks. The corner marks 91 include the information of reference positions in a case where the embedded image 9 is decoded. The corner marks 91 may be embedded in the embedded image 9.

Reference numeral 92 denotes blocks. The blocks 92 are areas of a predetermined size to which the original image 8 is divided. For example, the original image 8 is divided into the blocks 92 arranged in an N by M array.

Reference numeral 93 denotes block pairs. Each of the block pairs 93 includes two adjacent blocks. In the steganography technique according to the present embodiment, it is determined by a corresponding one of the block pairs 93 whether the value of a bit is zero or one.

It is assumed that one block in each of the block pairs 93 is a block A, and the other block is a block B. In this case, the value of a bit is defined in advance in, for example, the following manner: When the feature value of the block A is less than the feature value of the block B, the value of a bit indicated by a corresponding one of the block pairs 93 is defined as zero; and when the feature value of the block A is equal to or more than the feature value of the block B, the value of a bit indicated by a corresponding one of the block pairs 93 is defined as one.

Various types of elements can be used as the feature values of the blocks A and B in each of the block pairs 93 to be compared. One of the following elements may be used as a feature value: the average gray level (the average density) of pixels in a block, the lightness obtained when converting a color image to a grayscale image, the lightness and chroma of each color component of three primary colors (cyan, magenta, and yellow) in a color image, the granularity in a block, the barycenter of densities in a block, and the variance of densities in a block. It is hard for a human to visually recognize a change in a color component yellow as compared with the other components.

Encoding by steganography performed by the controller 2 will now be described.

The controller 2 in the image processing apparatus 1 embeds the code information 81 in the original image 8 to generate the embedded image 9. The controller 2 divides the original image 8 into the blocks 92 arranged in an N by M array. The controller 2 embeds a one-bit code for each of the block pairs 93 that corresponding two of the blocks 92 constitute.

The controller 2 outputs a bit value obtained from each of the block pairs 93 in the original image 8. The controller 2 obtains the feature value of each of the blocks 92. The controller 2 calculates a bit value by comparing the respective feature values of right and left blocks (the blocks A and B) in a corresponding one of the block pairs 93. The controller 2 compares bit values calculated from the block pairs 93 in the original image 8 with the respective bit values of input codes.

Regarding first ones of the block pairs 93 bit values corresponding to which agree with the respective bit values of the input codes, the controller 2 keeps the respective feature values in the original image 8. On the other hand, regarding second ones of the block pairs 93 bit values corresponding to which do not agree with the respective bit values of the input codes, the controller 2 changes the respective feature values of the blocks A and B in each of the second ones of the block pairs 93 so that a bit value corresponding to each of the second ones of the block pairs 93 agrees with a corresponding one of the respective bit values of the input codes.

In this case, when right and left blocks in each of the block pairs 93 are compared, setting is performed so that the difference between the respective feature values is equal to or more than a predetermined value. The magnitude of the predetermined value corresponds to the magnitude of the embedding strength. The larger the difference between the respective feature values of right and left blocks, the easier decoding. On the other hand, in an embedded image with a high embedding strength, the difference between the respective feature values of the blocks of a corresponding original image and the respective feature values of the blocks of the embedded image is large, and thus a person who views the embedded image is likely to feel strangeness in the embedded image. In a case where the difference between the feature values is small, when decoding is performed, the relationship between the respective values of blocks in each block pair in terms of magnitude may be reversed, thereby reducing the accuracy of detection.

The controller 2 changes the respective feature values of the blocks 92 in the original image 8 so that values corresponding to all the block pairs 93 agree with the respective values of the input codes. The embedded image 9 is an image that includes blocks the respective feature values of which are changed.

Figure 5:
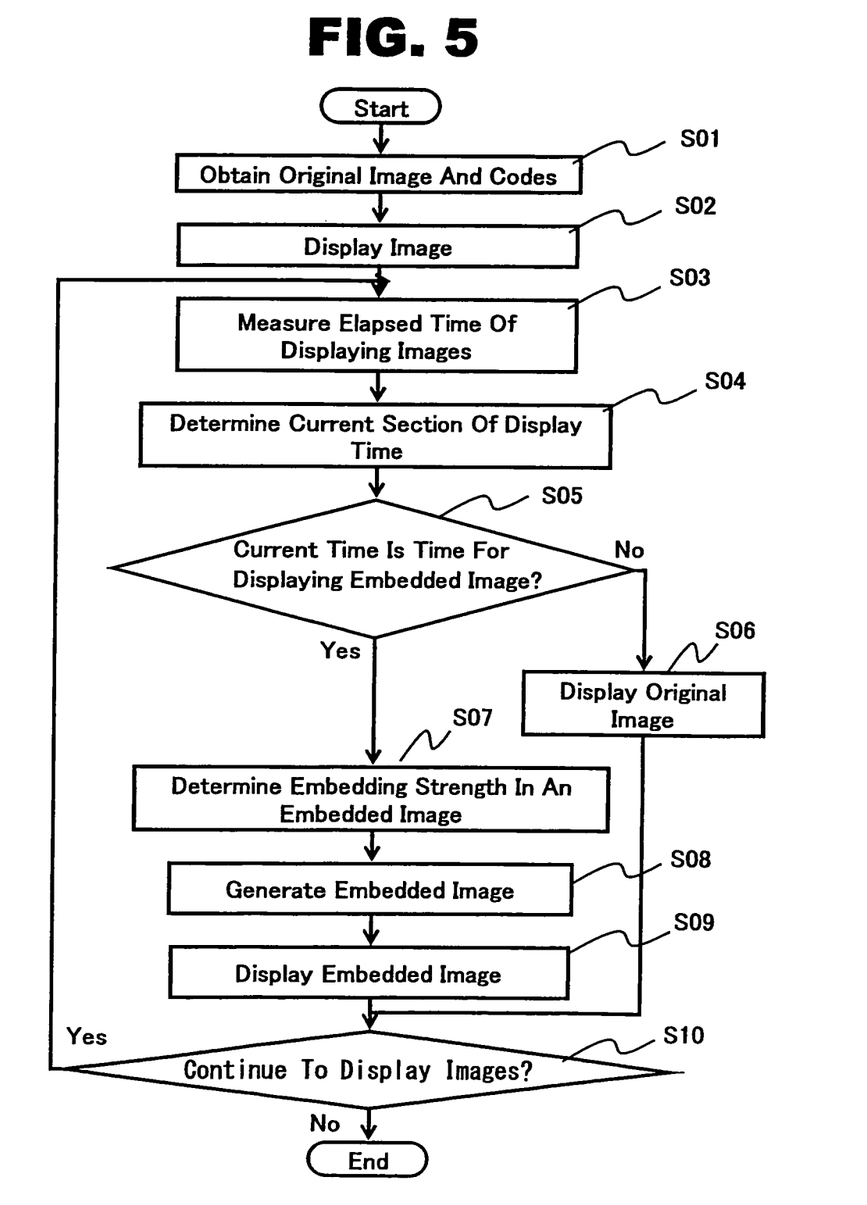
FIG. 5 is a flowchart showing a first process in which the image processing module generates an embedded image while displaying images.

A first process performed by the controller 2 in the image processing apparatus 1 will now be described. FIG. 5 is a flowchart showing the first process in which the image processing apparatus 1 generates an embedded image while displaying images. In step S01, the controller 2 obtains an original image and codes. The original image is image information to be displayed on the output module 4. The codes are information to be embedded in the original image. In step S02, the controller 2 starts the process of displaying images.

The controller 2 displays the original image. In step S03, the controller 2 starts to measure elapsed time from the start of the process of displaying images in step S02. In general, images are displayed on a television or a monitor for each frame. The number of frames to be displayed in a second is predetermined in televisions or monitors. Thus, the controller 2 may measure elapsed time on the basis of the number of frames that are displayed.

In step S04, the controller 2 determines the current section of display time. In step S05, the controller 2 determines whether the current time falls within a time period during which an original image is displayed or a time period during which an embedded image is displayed. The time period during which an original image is displayed and the time period during which an embedded image is displayed are defined in advance. For example, definition information indicating that, in one second, an original image is displayed for 0.9 seconds and an embedded image is displayed for 0.1 seconds is stored in the memory 5 and the storage module 6 in advance. It is assumed that the time period during which an embedded image is displayed is set so as to be shorter than the maximum time period that is too short for a human to gain visual perception.

When the controller 2 determines that the current time falls within the time period during which an original image is displayed, in step S06, the controller 2 displays the original image. On the other hand, when the controller 2 determines that the current time falls within the time period during which an embedded image is displayed, the controller 2 performs step S07 and subsequent steps.

In step S07, the controller 2 determines embedding strength with which codes are embedded in an embedded image. Then, in step S08, the controller 2 generates an embedded image with the embedding strength. In this case, when the embedding strength is always constant, generation of an embedded image may be omitted for the second and subsequent times. For example, when the controller 2 generates an embedded image for the first time in step S08, the controller 2 stores the generated embedded image in the memory 5. Next time the time falls within the time period during which an embedded image is displayed, the controller 2 reads the embedded image from the memory 5 instead of generating an embedded image. In this arrangement, the controller 2 only needs to read the embedded image from the memory 5, thereby achieving an advantageous effect in which image processing loads on the controller 2 are reduced.

In step S09, the controller 2 displays the embedded image on a display unit via the output module 4. Then, in step S10, the controller 2 determines whether to continue to display images. When the controller 2 determines to continue to display images, the controller 2 repeats step S03 and subsequent steps. On the other hand, when the controller 2 determines not to continue to display images, the controller 2 completes the process. For example, displaying the original image or the embedded image by the output module 4 is completed.

In the aforementioned process, the image processing apparatus 1 can alternately display an original image and an embedded image on a display unit. The time period during which an embedded image is displayed is short, it is hard for a human to visually recognize an embedded image.

Decoding in steganography will now be described. A decoder performs decoding. The decoder decodes codes embedded in the embedded image 9. The decoder first obtains the embedded image 9 using, for example, a camera function. The decoder cuts out an image area in which effective codes are embedded from the obtained embedded image 9. For example, the decoder cuts out an image area in which effective codes are embedded with reference to the corner marks 91. The decoder divides the image area, in which effective codes are embedded, into the blocks 92. The decoder calculates the density of each of the blocks 92. The decoder identifies one of the block pairs 93. The decoder compares the respective densities of blocks in the one of the block pairs 93. The decoder obtains the value of a bit by comparing blocks in a corresponding one of the block pairs 93. The decoder repeatedly compares blocks in each of all the block pairs 93. In the aforementioned process, the decoder obtains the respective values of the codes embedded in the embedded image 9.

The decoder according to the present embodiment obtains image information at intervals predetermined in the decoder. Thus, when the timing of acquisition of an image by the decoder matches the timing of appearance of an embedded image on a display unit, the decoder can obtain the data of the embedded image.

Moreover, the decoder may integrate values obtained by decoding image information to obtain more accurate values. The decoder obtains embedded image information at predetermined intervals and stores the values of the image information in a memory.

The decoder obtains the embedded image information again and stores values obtained from the image information in the memory. The accuracy of decoded values can be improved by repeating the aforementioned process.

The decoder checks the presence or absence of the corner marks 91 obtained by a camera to determines whether an original image is an embedded image. Moreover, an embedded image is generated in advance. Bits for detecting errors are added to the codes of the embedded image. It is assumed that the decoder performs detection again upon detecting that codes contain errors when performing decoding. In the aforementioned arrangement, the decoder can obtain an embedded image and extract code information from the embedded image.

Figure 6:
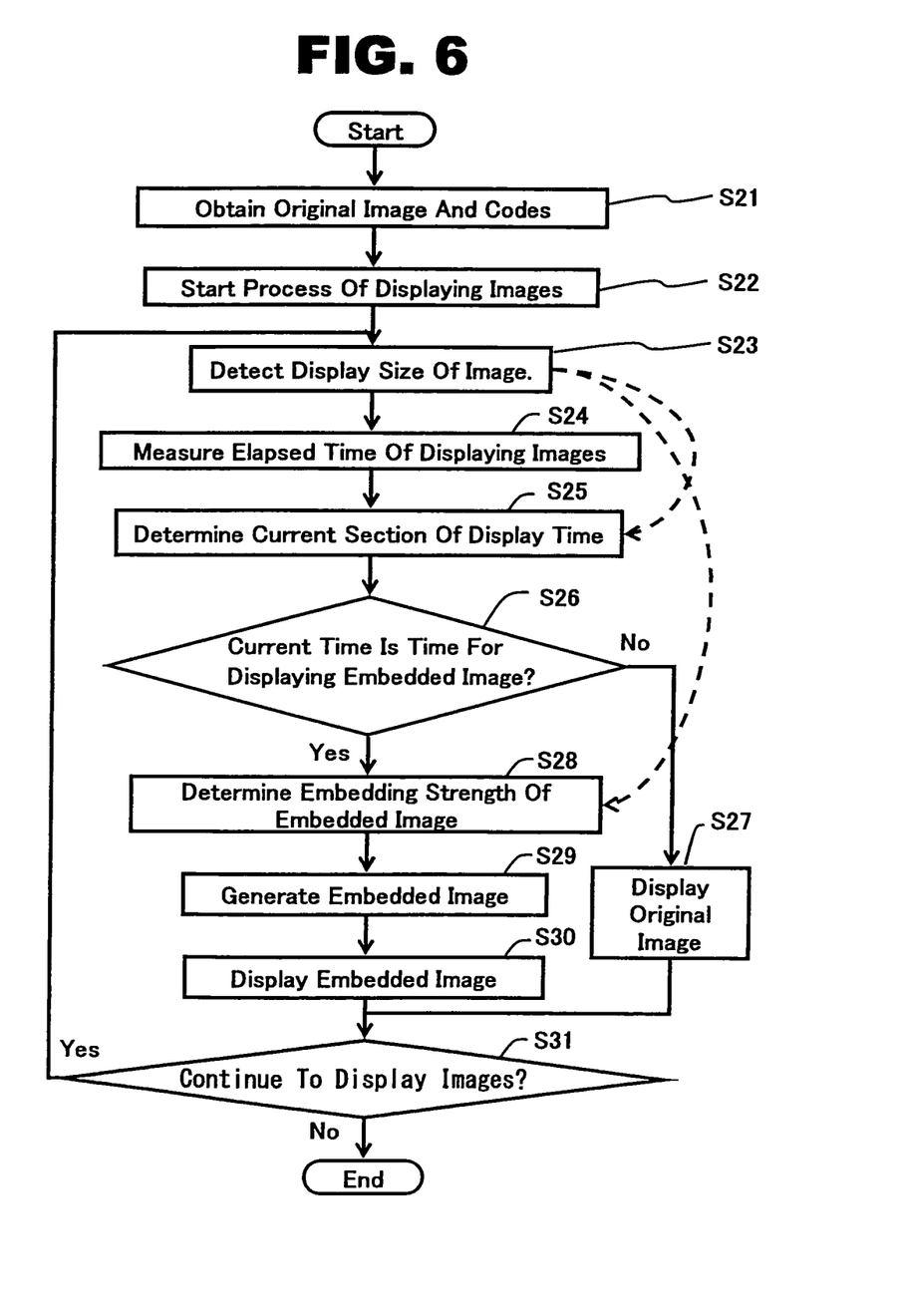
FIG. 6 is a flowchart showing a second process in which the image processing module can detect the physical size of an image on an output module.

A second process performed by the controller 2 in the image processing apparatus 1 will now be described. FIG. 6 is a flowchart showing the second process in which the image processing apparatus 1 can detect the physical size of an image on the output module 4.

In step S21, the controller 2 obtains an original image and codes. The original image is image information to be displayed on the output module 4. The codes are information to be embedded in the original image. In step S22, the controller 2 starts the process of displaying images. The controller 2 displays the original image. In step S23, the controller 2 detects the display size of the image.

Figure 7:
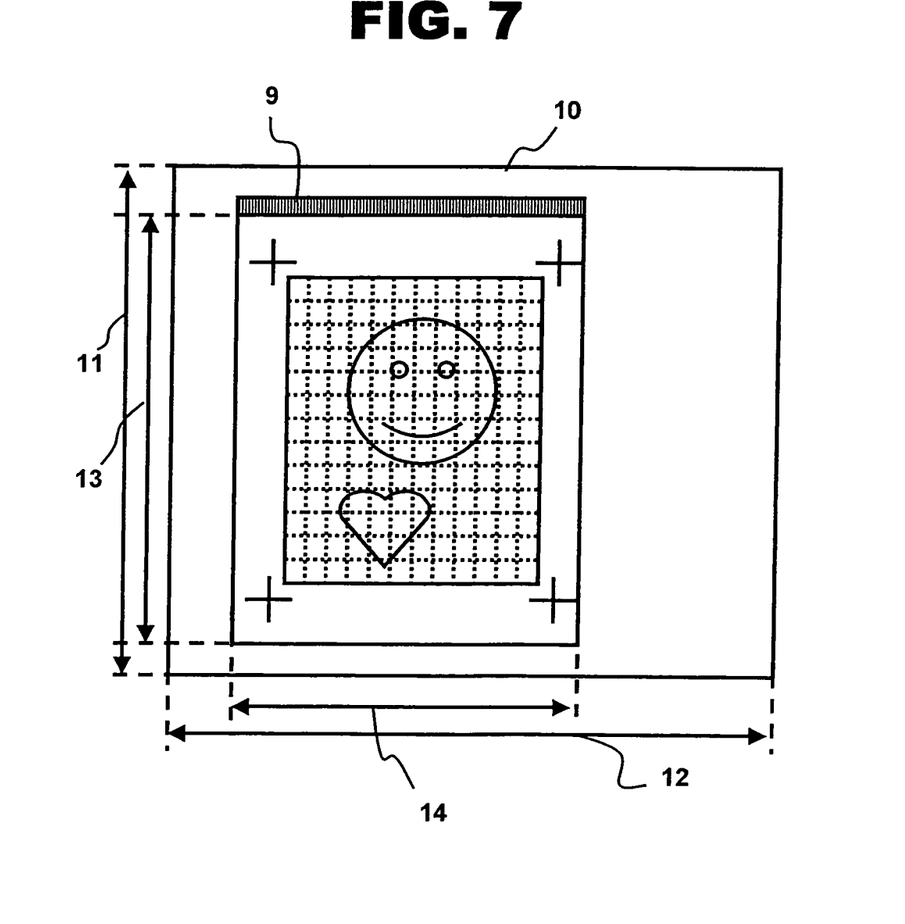
FIG. 7 shows an exemplary screen on which an image is displayed.

Detection of the size of the screen of, for example, a television or a display and the display size of an image to be displayed on the screen will now be described. FIG. 7 shows an exemplary screen on which an image is displayed.

Reference numeral 10 denotes an image display area. Reference numeral 11 denotes the height of the image display area 10. Reference numeral 12 denotes the width of the image display area 10. Reference numeral 9 denotes an image to be displayed in which codes are embedded. It is assumed that the image 9 is displayed larger than intended by an image provider. Reference numeral 13 denotes the height of the image 9. Reference numeral 14 denotes the width of the image 9.

The size of the display area of the screen of, for example, a television or a display varies with the display unit. Thus, the display size (the physical area) of an embedded image varies with the type of, for example, a television or a display. For example, the physical area of an image changes in a manner that depends on the size of the screen, screen resolution, and the like of a unit.

The size of each of the blocks of the embedded image 9 is defined so that the embedded image 9 displayed in a predetermined physical area is not visually recognized by a human. When the medium is printed paper, the predetermined physical area is determined by a provider. However, in a unit such as a television or a display, when the size of the screen large, the embedded image 9 may be displayed larger than intended. When the embedded image 9, which is enlarged, is displayed, blocks in an area in which codes are embedded are noticeable. In this case, when the embedding strength is decreased so that the blocks are invisible, it is hard to perform decoding.

The physical area of the embedded image 9 is obtained in, for example, the following manner: Information on the physical size of the image display area 10 is obtained in advance. For example, the size of a display unit in inches and the ratio (the aspect ratio) of the length (the number of pixels) of the height to the length (the number of pixels) of the width of a screen or an image are registered. The height 11 and width 12 of the image display area 10 are obtained from the size of a display unit in inches and the aspect ratio.

The controller 2 can obtain information on the number of pixels in the image display area 10. The controller 2 can obtain the number of pixels in the respective directions of the height 11 and width 12 of the image display area 10. The controller 2 can obtain the number of pixels in the respective directions of the height 13 and width 14 of an area on which the embedded image 9 is displayed.

The controller 2 obtains the ratio of the number of pixels in the embedded image 9 to the number of pixels in the image display area 10 from the number of pixels in the area, on which the embedded image 9 is displayed, and the number of pixels in the image display area 10. Then, the controller 2 obtains a physical area on which the embedded image 9 is displayed on the basis of the obtained ratio and the physical area of the image display area 10.

In the aforementioned process, the controller 2 obtains information on the physical area of an image.

Returning to FIG. 6, the controller 2 determines, on the basis of the physical area of the image obtained in step S23, the length of a time period during which an image in which codes are embedded is displayed in step S25 and the embedding strength in step S28.

A method for determination of the length of the time period during which an embedded image is displayed and the embedding strength by the controller 2 will now be described. The controller 2 changes the length of the time period during which an embedded image is displayed and the embedding strength in a manner that depends on the amount of the physical area of an embedded image. The larger the physical area of an embedded image displayed on a display unit, the more noticeable an area in which codes are embedded. Thus, the controller 2 determines the length of the time period during which an embedded image is displayed in a manner that depends on the amount of the physical area of an embedded image. Specifically, as the area of an embedded image is increased, the controller 2 shortens the time period during which an embedded image is displayed. As a result, it becomes hard for a human to visually recognize an embedded image, so that strangeness in images is reduced.

Moreover, when the controller 2 shortens the time period during which an embedded image is displayed, the controller 2 may accordingly increase the embedding strength. As a result, the number of times a decoder erroneously recognizes codes in an embedded image is reduced. For example, a table in which physical areas on which an embedded image is displayed, time periods during which an embedded image is displayed, and embedding strengths are correlated in advance may be provided so that the controller 2 can obtain a time period during which an embedded image is displayed and an embedding strength corresponding to an area of an image.

Figure 8:
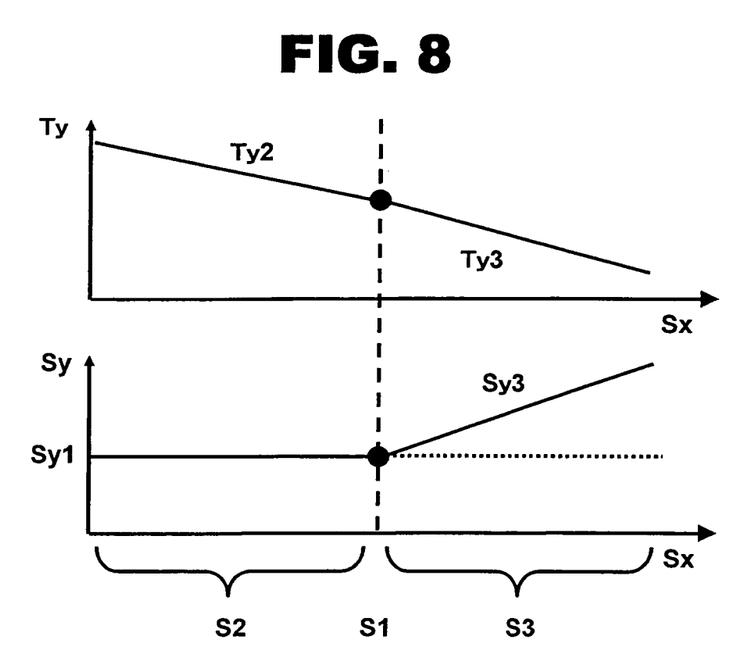
FIG. 8 is a graph showing the relationship between the area of an image and time and the relationship between the area of an image and the embedding strength.

Moreover, the controller 2 may calculate a time period during which an embedded image is displayed and an embedding strength from the difference between the reference area of an image and the current area of the image and a predetermined factor. FIG. 8 is a graph showing the relationship between the area of an image and time and the relationship between the area of an image and the embedding strength.

The Sx axis indicates the amount of the physical area of an image. The Ty axis indicates the length of the time period during which an embedded image is displayed. The Sy axis indicates the magnitude of the embedding strength. A value S1 indicates the amount of a physical area (hereinafter called a reference area) of an image assumed by the image provider. A value Sy1 indicates an embedding strength corresponding to the reference area.

When the amount of the physical area of an embedded image is equal to or less than an amount assumed by the image provider (a section S2), it is hard for a human to visually recognize strangeness in an image caused by embedding of codes. Thus, the controller 2 may set the embedding strength to a strength (Sy1) that is originally predetermined. Moreover, when the physical area of an embedded image is the same as the reference area (S1), it is hard for a human to visually recognize codes in an embedded image, and thus the controller 2 may set a longer time period (Ty2) during which an embedded image is displayed. In the section S2, the controller 2 may always display embedded image codes.

On the other hand, when the amount of the physical area of an embedded image is equal to or more than the amount assumed by the image provider (a section S3), the controller 2 shortens the time period during which an embedded image is displayed in the unit time (Ty3). Moreover, the controller 2 sets an embedding strength (Sy3) that is higher than the embedding strength Sy1 corresponding to the reference area S1.

In this arrangement, regardless of the physical area of an embedded image, it is hard for a human to visually recognize the embedded image, and a decoder can decode codes in the embedded image.

Returning to FIG. 6, subsequent steps are similar to those in FIG. 5 and thus will be described in brief.

In step S24, the controller 2 measures elapsed time from the start of the process of displaying images in step S22. In step S25, the controller 2 determines the current section of display time. In step S26, the controller 2 determines whether the current time falls within the time period during which an original image is displayed or the time period during which an embedded image is displayed. When the controller 2 determines that the current time falls within the time period during which an original image is displayed, in step S27, the controller 2 displays the original image. On the other hand, when the controller 2 determines that the current time falls within the time period during which an embedded image is displayed, the controller 2 performs step S28 and subsequent steps. In step S28, the controller 2 determines embedding strength with which codes are embedded in an embedded image.

Then, in step S29, the controller 2 generates an embedded image with the embedding strength. In step S30, the controller 2 displays the embedded image on the output module 4. Then, in step S31, the controller 2 determines whether to continue to display images. When the controller 2 determines to continue to display images, the controller 2 repeats step S23 and subsequent steps. On the other hand, when the controller 2 determines not to continue to display images, the controller 2 completes the process.

In the aforementioned process, the image processing apparatus 1 can alternately display an original image and an embedded image on the output module 4. The time period during which an embedded image is displayed is short, it is hard for a human to visually recognize an embedded image.

Figure 9:
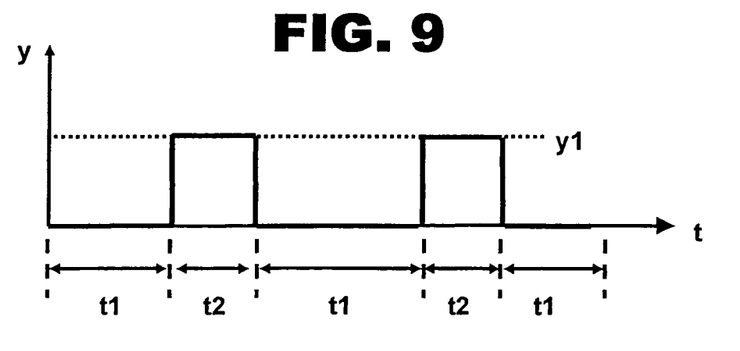
FIG. 9 shows the state of display of images in the present embodiment.

FIG. 9 shows the state of display of images in the present embodiment. In a graph in FIG. 9, the abscissa t indicates elapsed time during which images have been displayed, and the ordinate y indicates the embedding strength in steganography. The embedding strength means the readability of codes in an embedded image. In general, the higher the embedding strength y, the easier reading of codes. Moreover, the higher the embedding strength, the larger the difference between an embedded image and an original image. In the present embodiment, an original image and an embedded image are displayed alternately. A value y1 indicates an embedding strength that is generally used when codes are embedded in an image.

Reference letter t1 denotes a time period during which an original image is displayed. Reference letter t2 denotes a time period during which an embedded image is displayed. The time period t2 is set so that the time period t2 is long enough for a decoder to recognize an embedded image and short enough for a human not to visually recognize an embedded image. When the time period t2 is short, it is hard for a human to visually recognize an embedded image. On the other hand, the time period t1 is relatively long. Thus, a human recognizes an original image. Moreover, even when the time period t2 is too short for a human to visually recognize an embedded image, a decoder can obtain an embedded image. In this arrangement, images from which codes in an embedded image can be obtained without decreasing the quality of an original image can be provided.

Another method for displaying images will now be described. When an embedded image is output on a paper medium, the embedding strength with which codes are embedded in an embedded image is decreased enough for a human not to visually recognize the difference between an original image and an embedded image. On the other hand, in the present embodiment, since the time period during which an embedded image is displayed is short, it is hard for a human to visually recognize an embedded image. Thus, the controller 2 displays an embedded image that is generated with an embedding strength that is higher than an embedding strength used for a paper medium. Since the time period during which an embedded image is displayed is short, it is hard for a human to visually recognize an embedded image the embedding strength of which is increased.

Thus, the controller 2 sets an embedding strength that is higher than the maximum embedding strength that is predetermined in advance, an embedded image that is generated with the maximum embedding strength being not visually recognized by a human. In this arrangement, the time period during which an embedded image is displayed is short, and thus a human cannot visually recognize an embedded image. On the other hand, the controller 2 generates an embedded image with an increased embedding strength and displays the embedded image. As a result, a decoder can reliably decode an embedded image.

Figure 10:
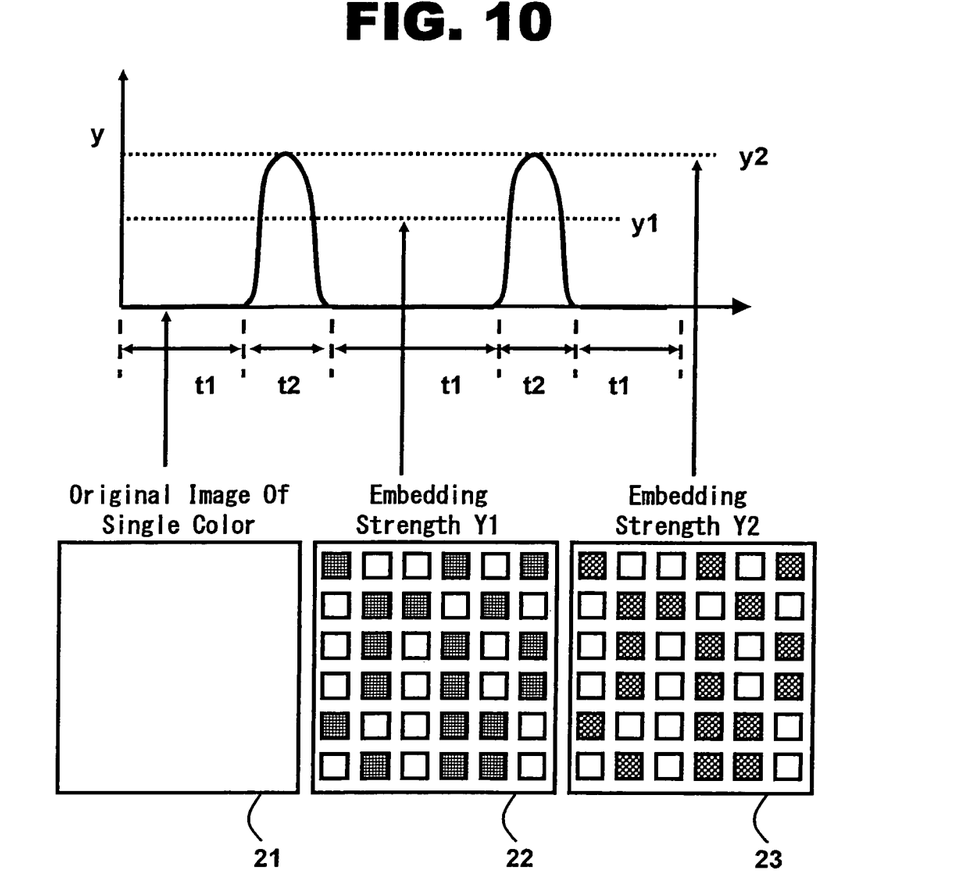
FIG. 10 shows the state of display of images in a case where the embedding strength is increased.

FIG. 10 shows the state of display of images in a case where the embedding strength is increased. In a graph in FIG. 10, the abscissa t indicates elapsed time during which images have been displayed. Reference letter t1 denotes a time period during which an original image is displayed. Reference letter t2 denotes a time period during which an embedded image is displayed. In the graph in FIG. 10, the ordinate y indicates the embedding strength in steganography. The embedding strength means the readability of codes in an embedded image. An embedding strength y1 is generally used to embed codes in an image. It is hard for a human to visually recognize an embedded image that is generated with the embedding strength y1. An embedding strength y2 is an embedding strength that allows a human to visually recognize codes embedded in an image.

Reference numeral 21 denotes an area of the original image 8 of a single color. Reference numeral 22 denotes an area that is obtained by embedding codes in the area 21 with the embedding strength y1. In the area 22, it is hard for a human to visually recognize existence of the codes. Reference numeral 23 denotes an area that is obtained by embedding codes in the area 21 with the embedding strength y2. It is assumed that, in the area 23, a human can visually recognize existence of the codes. When the time period t1 is sufficiently long relative to the time period t2, a human cannot recognize that an original image has changed to an embedded image. Thus, an arrangement is adopted, in which an embedded image in which codes are embedded with the embedding strength y2 is displayed during the time period t2.

A method for changing the display time of an embedded image in a manner that depends on elapsed time will now be described. A decoder obtains embedded image information using, for example, a camera provided in the decoder. The performance of a camera provided in a decoder varies. The performance of a camera affects the length of the time necessary to obtain image information. When the display time of an embedded image is short, a decoder may not recognize an embedded image.

Thus, the controller 2 changes the length of the display time of an embedded image in a manner that depends on time that has elapsed since the controller 2 started to display images. In this arrangement, even when the time necessary for a camera to obtain an image is long, a decoder can obtain embedded image information.

Figure 11:
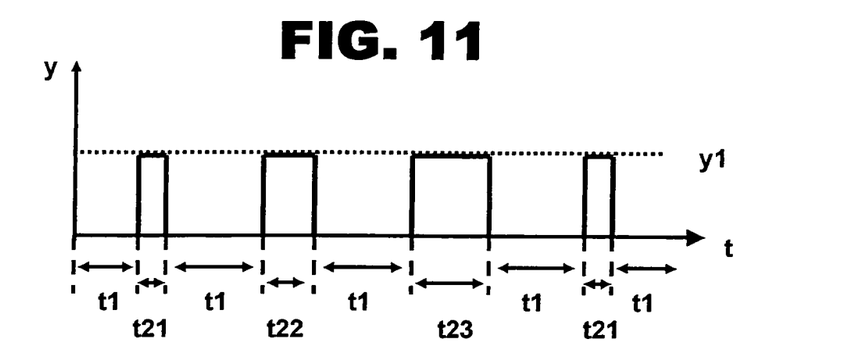
FIG. 11 shows the state of display of images in a case where the display time of an embedded image is changed.

FIG. 11 shows the state of display of images in a case where the display time of an embedded image is changed. In a graph in FIG. 11, the abscissa t indicates elapsed time during which images have been displayed. Reference letter t1 denotes a time period during which an original image is displayed. Reference letters t21, t22, and t23 each denote a time period during which an embedded image is displayed. In the graph in FIG. 11, the ordinate y indicates the embedding strength in steganography. An embedding strength y1 is generally used to embed codes in an image. The respective lengths of the time periods t21, t22, and t23 are different from each other. A decoder obtains embedded image information during one of the time periods t21, t22, and t23 in a manner that depends on the length of the time necessary for a camera to obtain an image.

The controller 2 performs, for example, the following process to display images while changing the display time period: It is assumed that a table in which the relationships between a plurality of display time periods and the numbers of times an embedded image is displayed are defined is stored in the memory 5 or the storage module 6 in advance. The controller 2 counts the number of times a time period during which an embedded image is displayed has elapsed. The number of times a time period during which an embedded image is displayed has elapsed can be obtained from the number of times it is determined in step S05 in FIG. 5 that the current time falls within a time period during which an embedded image is displayed. The controller 2 reads, from the table, a display time period corresponding to the number of times a time period during which an embedded image is displayed has elapsed. In this arrangement, the controller 2 can perform switching among a plurality of display time periods during which an embedded image is displayed.

Moreover, the controller 2 may change the embedding strength of an embedded image in a manner that depends on the display time. The performance of a camera used by a decoder varies. In a manner that depends on the performance of a camera, it may be difficult to recognize an embedded image the embedding strength of which is equal to a predetermined level. Thus, the controller 2 changes the embedding strength of an embedded image in a manner that depends on time that has elapsed since the controller 2 started to display images. As a result, even when a camera the performances of which is different is used, a decoder can recognize an embedded image.

The controller 2 performs, for example, the following process to display images while changing the embedding strength: It is assumed that a table in which the relationships between a plurality of embedding strengths and the numbers of times a time period during which an embedded image is displayed has elapsed are defined is stored in the memory 5 or the storage module 6 in advance. The controller 2 counts the number of times a time period during which an embedded image is displayed has elapsed. The number of times a time period during which an embedded image is displayed has elapsed can be obtained from the number of times it is determined in step S05 in FIG. 5 that the current time falls within a time period during which an embedded image is displayed. The controller 2 reads, from the table, an embedding strength corresponding to the number of times a time period during which an embedded image is displayed has elapsed. In this arrangement, the controller 2 can perform switching among a plurality of embedding strengths.

Moreover, in the image processing apparatus 1, a method for changing the embedding strength in a manner that depends on the type of a display unit may be adopted. In the case of printed matter, since a corresponding specific printer can be determined, an image provider can perform adjustment so that the most suitable embedded image is obtained. However, in the case of display units, there are many types, and thus how an image is displayed may vary with the type of a display.

Thus, an arrangement is adopted, in which an embedded image is changed in a manner that depends on the type of a display. For example, the memory 5 stores a table that is created in advance in which the respective types of display units and embedding strengths are correlated. It is assumed that the controller 2 obtains information on the type of a display unit in advance.

When the controller 2 determines the embedding strength in step S07 in FIG. 5, the controller 2 reads an embedding strength corresponding to the information on the type of the display unit. In this process, an embedded image suitable for a display unit can be generated.

In the aforementioned processes, a method in which the image processing apparatus 1 generates an embedded image while displaying images has been described. Alternatively, a unit generating image data that includes a function of alternately displaying an original image and an embedded image in the unit time and a unit displaying the generated image data may be provided separately. For example, when the output characteristics of a display are determined in advance, the unit generating image data may generate image data suitable for the display in advance.

Moreover, in the aforementioned processes, in the image processing apparatus 1, the number of pieces of code information to be embedded in an original image is one. However, a plurality of embedded images obtained by embedding a plurality of different pieces of code information in original image information may be displayed.

Another display method may be adopted, in which different pieces of code information are correlated to a plurality of pieces of original image information, and a plurality of embedded images in which the pieces of code information are embedded are displayed.

Figure 12:
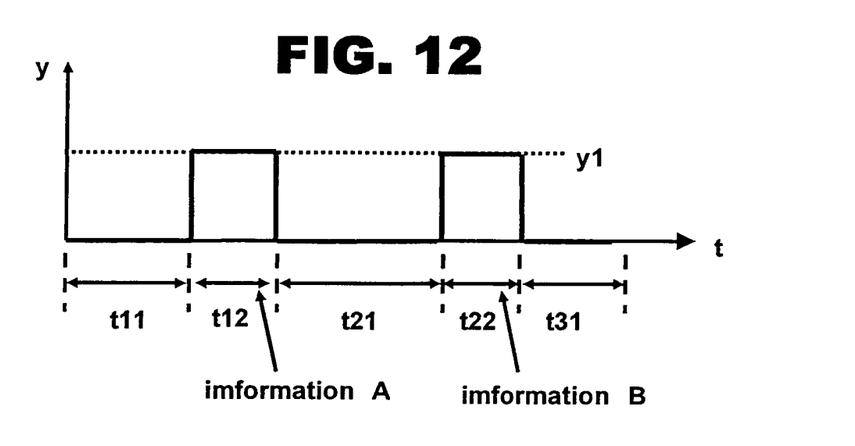
FIG. 12 shows the state of display of images in a case where a plurality of pieces of original image information and embedded images in which pieces of code information corresponding to the pieces of original image information are embedded are displayed.

FIG. 12 shows the state of display of images in a case where a plurality of pieces of original image information and embedded images in which pieces of code information corresponding to the pieces of original image information are embedded are displayed. In a graph in FIG. 12, the abscissa t indicates elapsed time during which images have been displayed. Reference letter t11 denotes a time period during which a first original image is displayed. Reference letter t12 denotes a time period during which a first embedded image corresponding to the first original image is displayed. Reference letter t21 denotes a time period during which a second original image is displayed. Reference letter t22 denotes a time period during which a second embedded image corresponding to the second original image is displayed. In the graph in FIG. 12, the ordinate y indicates the embedding strength in steganography. An embedding strength y1 is generally used to embed codes in an image. An embedded image displayed in the time period t12 is different from an embedded image displayed in the time period t22 in embedded code information. Code information "information A" is embedded in an embedded image displayed in the time period t12. Code information "information B" is embedded in an embedded image displayed in the time period t22.

The controller 2 performs, for example, the following process to display embedded images the respective pieces of code information of which are different from each other: In step S01 in FIG. 5, the controller 2 obtains a plurality of pieces of original image information and a plurality of different pieces of code information corresponding to the plurality of pieces of original image information. The controller 2 creates, in the memory 5 or the storage module 6, a table in which the relationships between the numbers of times a time period during which an original image is displayed has elapsed and pieces of code information are defined. The controller 2 counts the number of times a time period during which an original image is displayed has elapsed. The number of times a time period during which an original image is displayed has elapsed can be obtained from the number of times it is determined in step S05 in FIG. 5 that the current time falls within a time period during which an original image is displayed. When the controller 2 generates an original image or an embedded image, the controller 2 reads, from the table, a piece of code information corresponding to the number of times a time period during which an original image is displayed has elapsed.

In FIG. 12, once an embedded image is displayed, an original image will be switched to another original image. Any number of times the embedded image is displayed until the original image is switched to the other original image can be selected.

In this arrangement, the controller 2 can display a plurality of embedded images in which pieces of embedded code information vary with original images. The controller 2 can display a piece of code information corresponding to an original image. A user can obtain a desired piece of code information by capturing an image when a desired original image is displayed.

Since the unit displaying image data only needs to display image data, the processing loads are reduced. This method is effective in, for example, fields in which many displays of the same type exist. For example, characteristics can be classified in a manner that depends on the respective models of cellular phones and mobile terminals.

The image processing module according to the present embodiment can display an embedded image that is illegible to human eyes and from which a decoder can readily obtain codes.

In addition to variations and modifications in the component parts and/or arrangements, alternative uses will also be apparent to those skilled in the art.

What is claimed is:

1. A method executed by a computer for displaying an image including a plurality of blocks in which code information can be embedded, comprising:
    obtaining a first image including a plurality of blocks;
    generating a second image using a characteristic value of selected blocks of the first image and adding the code information to be embedded;
    obtaining size information indicating a physical size of the first image and the second image when determining one of the first image and the second image is displayed on a display;
    determining a first of a time period of displaying the first image and a second of the time period of displaying the second image by shortening the second time period in correspondence with an increase of the physical size of the first image; and
    displaying the first image until the first time period passes, and switching to displaying the second image until the second time period passes, by adjusting the first time period and the second time period within the time period relative to the physical size of the first image, by the computer.

2. The method according claim 1, wherein the first time period is longer than the second time period.

3. The method according claim 1, wherein the determining determines the second time period based on a time that has elapsed since one of the first image and the second image were displayed.

4. The method according claim 1, wherein the first image and the second image are displayed at the same position.

5. The method according claim 1, wherein when the second time period during which the second image data is displayed is shortened, an embedding strength is correspondingly increased.

6. The method according claim 1, wherein the second image is obtained by adding the code information to the first image.

7. The method according claim 1, wherein the first time period and the second time period are predefined and the first image and the second image are displayed sequentially.

8. A non-transitory tangible computer readable medium storing a program for controlling an apparatus to execute an operation including displaying an image including a plurality of blocks in which code information can be embedded, the operation comprising:
    obtaining a first image including a plurality of blocks;
    generating a second image using a characteristic value of a selected blocks of the first image and adding the code information to be embedded;
    obtaining size information indicating a physical size of the first image and the second image when one of the first image and the second image is displayed on a display;
    determining a first of a time period of displaying the first image and a second of the time period of displaying the second image by shortening the second time period in correspondence with an increase of the physical size of the first image; and
    displaying the first image until the first time period passes, and switching to displaying the second image until the second time period passes, by adjusting the first time period and the second time period within the time period relative to the physical size of the first image, by the computer.

9. An apparatus for displaying an image including a plurality of blocks in which code information can be embedded, comprising:
    a memory to store a first image including a plurality of blocks; and
    a processor executing:
        generating a second image using a characteristic value of a selected blocks of the first image and adding the code information to be embedded;
        obtaining size information indicating a physical size of the first image and the second image when one of the first image and the second image is displayed;
        determining a first of a time period of displaying the first image and a second of the time period of displaying the second image by shortening the second time period in correspondence with an increase of the physical size of the first image;
    a monitor for displaying the first image until the first time period passes, and switching to displaying the second image until the second time period passes, by adjusting the first time period and the second time period within the time period relative of the physical size of the first image, by the computer.

* * * * *

UNITED STATES PATENT AND TRADEMARK OFFICE
CERTIFICATE OF CORRECTION

PATENT NO. : 8,451,264 B2
APPLICATION NO. : 12/232094
DATED : May 28, 2013
INVENTOR(S) : Nobuyasu Yamaguchi et al.

It is certified that error appears in the above-identified patent and that said Letters Patent is hereby corrected as shown below:

In the Claims:

Column 13, Line 61, In Claim 2, after "according" insert -- to --.

Column 14, Line 1, In Claim 3, after "according" insert -- to --.

Column 14, Line 5, In Claim 4, after "according" insert -- to --.

Column 14, Line 7, In Claim 5, after "according" insert -- to --.

Column 14, Line 11, In Claim 6, after "according" insert -- to --.

Column 14, Line 14, In Claim 7, after "according" insert -- to --.

Signed and Sealed this
Twenty-seventh Day of August, 2013

Teresa Stanek Rea
*Acting Director of the United States Patent and Trademark Office*